(12) United States Patent
Li et al.

(10) Patent No.: US 11,605,824 B2
(45) Date of Patent: Mar. 14, 2023

(54) ZINC IODINE FLOW BATTERY

(71) Applicant: DALIAN INSTITUTE OF CHEMICAL PHYSICS, CHINESE ACADEMY OF SCIENCES, Liaoning (CN)

(72) Inventors: Xianfeng Li, Liaoning (CN); Congxin Xie, Liaoning (CN); Huamin Zhang, Liaoning (CN)

(73) Assignee: DALIAN INSTITUTE OF CHEMICAL PHYSICS, CHINESE ACADEMY OF SCIENCES, Liaoning (CN)

( * ) Notice: Subject to any disclaimer, the term of this patent is extended or adjusted under 35 U.S.C. 154(b) by 319 days.

(21) Appl. No.: 16/762,491

(22) PCT Filed: Oct. 30, 2018

(86) PCT No.: PCT/CN2018/112535
§ 371 (c)(1),
(2) Date: May 7, 2020

(87) PCT Pub. No.: WO2019/091304
PCT Pub. Date: May 16, 2019

(65) Prior Publication Data
US 2021/0184233 A1  Jun. 17, 2021

(30) Foreign Application Priority Data

Nov. 8, 2017 (CN) .......................... 201711090856.2
Nov. 8, 2017 (CN) .......................... 201711091359.4

(51) Int. Cl.
*H01M 8/04186* (2016.01)
*H01M 8/04082* (2016.01)
*H01M 8/18* (2006.01)

(52) U.S. Cl.
CPC ............... *H01M 8/04186* (2013.01); *H01M 8/04201* (2013.01); *H01M 8/188* (2013.01)

(58) Field of Classification Search
CPC ......... H01M 8/04186; H01M 8/04201; H01M 8/188; H01M 4/96
See application file for complete search history.

(56) References Cited

U.S. PATENT DOCUMENTS

2016/0308234 A1* 10/2016 Reece ................. H01M 8/0202

FOREIGN PATENT DOCUMENTS

CN  102479968 A   5/2012
CN  105742656   *  7/2016
(Continued)

OTHER PUBLICATIONS

Li, Bin et al., "Ambipolar Zinc-Polyiodide Electrolyte for a High-Energy Density Aqueous Redox Flow Battery", Nature Communications, Feb. 24, 2015.*

(Continued)

*Primary Examiner* — Brittany L Raymond
(74) *Attorney, Agent, or Firm* — Novick, Kim & Lee, PLLC; Allen Xue

(57) ABSTRACT

A zinc iodine flow battery includes a positive end plate, a positive current collector, a negative current collector, a positive electrode with a flow frame, a membrane, a negative electrode with a flow frame, a negative end plate. The negative electrolyte is circulated between the negative storage tank and the negative cavity by pump. The negative pipe is provided with a branch pipe for the positive electrolyte circulation. The porous membrane between the positive and negative electrodes can realize the conduction of supporting electrolyte and prevent the diffusion of I3- to the negative electrolyte. In a duel-flow battery system, same electrolyte serves as both the positive electrolyte and the negative (Continued)

electrolyte, which is a mixed aqueous solution containing iodized and zinc salt. The membrane is porous membrane does not contain ion exchange group. Both the positive and negative electrolyte are neutral solutions.

12 Claims, 16 Drawing Sheets

(56) References Cited

FOREIGN PATENT DOCUMENTS

| | | | |
|---|---|---|---|
| CN | 105742656 A | | 7/2016 |
| CN | 206022528 | * | 3/2017 |
| CN | 206066528 U | | 4/2017 |
| KR | 20170024176 A | | 3/2017 |

OTHER PUBLICATIONS

English translation of CN Publication 105742656, Jul. 2016.*
English translation of CN Publication 206022528, Mar. 2017.*
Li, Bin et al. "Ambipolar Zinc-Poluiodide Electrolyte for a High-Energy Density Aqueous Redox Flow Battery"; Nature Communications, Feb. 24, 2015.

* cited by examiner

ZINC IODINE FLOW BATTERY

TECHNICAL FIELD

The invention relates to the field of flow battery, in particular to the field of zinc iodine flow battery.

BACKGROUND TECHNOLOGY

The massive consumption of fossil energy has caused energy crisis and environmental problems. The development and utilization of renewable energy has received great attention all over the world. However, the discontinuity and instability of renewable energy, such as wind and solar energy, enable the difficult utilization of it, therefore, the realization of the continuous supply of renewable energy via the large scale energy storage technology is the key to solve the above problem. Due to the advantages of flexible design (energy and power are designed separately), high safety, long cycling life and not limited by terrain, flow battery has become one of the best technologies for large-scale energy storage. Among them, all vanadium flow battery has entered the commercial demonstration stage with its unique technical advantages.

At present, the relatively mature flow system technologies include all vanadium flow batteries, zinc bromine flow batteries, sodium polysulfide bromine and other systems. However, as for vanadium flow battery, the high cost, acidity and corrosiveness of electrolyte and the strongly oxidizing sulfuric acid and $VO_2^+$ enable high requirement for the membrane; zinc bromine and sodium polysulfide bromine flow battery would generate corrosive bromine during the charging process. At the same time, the high vapor pressure, severe volatilization and environmental pollution of $Br_2$ need to be further considered.

Zinc iodine flow batteries employ neutral zinc and iodide salt as electrolyte, which has the advantage of high solubility and energy density. Compared with $Cl_2$ and $Br_2$, iodine is less corrosive. In the meantime, iodine exists in the form of $I_3^-$ and the vapor pressure is much lower, which makes the zinc-iodine flow battery a promising system. Same as common flow batteries, the zinc iodine flow battery (replaced as "zinc iodine dual-flow battery" in PCT) adopts a dual-pump and pipeline design. During the charge and discharge process, the positive and negative electrolytes circulate between the battery cavity and electrolyte storage tank. However, because batteries require electrolyte circulation systems such as pumps and storage tanks, the energy efficiency of the system is reduced. On the other hand, the battery auxiliary equipment such as pumps and storage tanks complicate the battery system and reduce the energy density of the system. Therefore, research on single flow battery based on dual-flow system and reducing the energy loss of the system is an important way to improve the energy utilization efficiency and energy density of the whole system. In addition, currently reported zinc iodine dual-flow batteries usually use expensive Nafion membranes, but the above-mentioned ion-exchange membranes could be easily contaminated in the zinc-iodine system, leading to an increase in ohmic resistance and poor cycle stability of the battery. In addition, zinc iodine flow batteries use $ZnI_2$ as the electrolyte, which is easily oxidized by air to generate ZnO precipitation. At the same time, $I_2$ would be desposited on the positive electrode which restricted the stability of the electrolyte and then the cycling life. Therefore, the reported working current density is less than 10 mA/cm$^2$, which lead to a low power density.

SUMMARY OF THE INVENTION

To solve the above problems, the content of the invention is as follows:

A zinc iodine flow battery comprises either a single battery or a stack. The single flow battery includes a porous electrode and cavity on the positive side which is filled with electrolyte. In a zinc iodine dual-flow battery, the positive or negative electrolyte circulates inside the battery and in the storage tank through a pump and a pipeline, for single flow battery, there is no pump or pipeline on the positive side, and the electrolyte is stored in the porous electrode and cavity. As for the negative side, the electrolyte in the battery and in the negative storage tank could be circuited through the pump and pipeline, and pipeline is provided with a branch for the circulation of the positive electrolyte. The dual-flow battery also includes positive and negative electrolyte storage tanks, which contain the positive and negative electrolyte, respectively.

When the battery is being charged, $I^-$ is oxidized to $I_3^-$ or $I_2$ on the positive electrode, and $Zn^{2+}$ on the negative electrode is reduced to Zn; during discharging, the positive electrolyte is reduced to $I^-$, and the Zn is oxidized to $Zn^{2+}$. The membrane between the positive and negative electrodes prevents $I_3^-$ from migrating to the negative electrode while conducting the supporting electrolyte.

Compared with the dual-flow battery, the zinc iodine single flow battery eliminates the positive storage tank and pump on the positive side, the positive electrolyte is sealed in the positive porous electrode. Furthermore, the negative pipe is provided with a branch pipe for positive electrolyte circulation. The structure of single flow battery includes positive and negative end plates, membrane, positive electrode, negative electrode, current collector, flow frame, pump and pipeline. The structure of the dual-flow battery includes positive end plate, negative end plate, membrane, positive electrode, negative electrode, current collector, flow frame, pump and pipeline.

The positive electrolyte composition includes iodine salt, zinc salt, and the supporting electrolyte. Iodine salt is one or more of $CaI_2$, $MgI_2$, KI and NaI, with a concentration of 2-8 mol/L. The active substance in the negative electrolyte is one or more of $Zn(NO_3)_2$, $ZnBr_2$, $ZnSO_4$, $ZnCl_2$, with the concentration of 1-4 mol/L, the molar ratio of iodine and zinc in the electrolyte of dual-flow battery is 2:1, the supporting electrolyte of single flow battery is one or more of KCl, KBr, NaCl and the concentration is 1-2 mol/L. Among them, KI is a preferred iodine salt, $ZnBr_2$ is a preferred zinc salt, KCl is a preferred supporting electrolyte and the concentration is 1 mol/L for the dual-flow battery.

The electrode material is one of carbon felt, graphite plate, metal plate or carbon cloth. The electrode material is preferably carbon felt.

As for the zinc iodine flow battery, the membrane used for the zinc iodine single flow battery is a porous membrane without ion exchange groups or a composite membrane. The membrane used for a duel-flow battery is a porous membrane without ion exchange groups or a composite membrane. The substrate is a porous membrane, which includes one or more of polyethersulfone (PES), polyethylene (PE), polypropylene (PP), polysulfone (PS), polyetherimide (PEI), and polyvinylidene fluoride (PVDF). The membrane thickness is 100-1000 μm, preferably 500-1000 μm. The pore diameter is about 10-100 nm with the porosity of 30%-70%. Polyethylene (PE) and polypropylene (PP) are preferred porous substrate. In addition, as for zinc iodine single flow battery, the porous membrane is coated with a dense polymer layer to improve the coulomb efficiency of the battery; the material of which include: polybenzimidazole (PBI), Nafion resin and (polytetrafluoroethylene) PTFE. Nafion resin is preferred and the thickness of the coating is 1-10 μm.

The Invention has the Following Beneficial Effects:

1. Compared with the dual-flow battery, the structure of zinc iodine single flow battery is greatly simplified, which improves the energy density of the battery. At the same time, the energy loss of the system is reduced, which improves the energy efficiency of the system. In addition, the concentration of electrolyte is very high, which is suitable for single flow battery design; same as dual-flow battery, zinc iodide single flow battery solves the strong acid and alkali issue of electrolyte and the cost of electrolyte is relatively low; at the same time, high current density and the power density of battery could also be achieved.

2. The positive and negative electrolytes are the same, which effectively alleviates the crossover issue due to the similar osmotic pressure of the positive and negative electrolytes. Therefore, the coulomb efficiency could be greatly improved, which effectively reduces the system maintenance costs caused by electrolyte migration. Furthermore, the electrolyte could be recovered online, which greatly saves the replacement cost of the electrolyte and demonstrates a good application prospect.

3. Iodine and zinc salt could be employed as the reactant of dual-flow battery with low cost and environment friendliness; the high solubility of zinc and iodine salt achieved high energy density. Furthermore, the high electrochemical activity of electrolyte enables a high current density and power density of the battery; at the same time, the negligible corrosiveness of electrolyte could greatly reduce the environmental burden. The invented zinc iodine flow battery solves the issue of strong acid and alkali of electrolyte, besides, the supporting electrolyte could improve the conductivity of the electrolyte and then the voltage efficiency.

4. The low-cost porous membrane replaces the traditional Nafion 115 membrane, which greatly reduces the cost of the stack. In addition, the porous structure of the membrane could improve the conduction of neutral ions and the current density of the battery can reach 140 mA/cm$^2$, which means great improvement in the voltage efficiency. Most importantly, the porous structure of the porous membrane is filled with oxidized $I_3^-$, which can alleviate the short-circuit issue that caused by zinc dendrite after overcharging, so the battery could be self-recovered and greatly improve the stability of the battery. In addition, Nafion coating can effectively alleviate $I_2/I_3^-$ crossover and significantly improve the coulomb efficiency of single flow battery (higher than 98%).

5. The traditional zinc iodine flow battery employs $ZnI_2$ as the reactant, which tends to be oxidized into ZnO at room temperature and reduces the cycle stability of the battery; replacing $ZnI_2$ with KI greatly improves the stability of the positive electrolyte and the price of KI is much lower than that of $ZnI_2$, so the cost of the electrolyte could be greatly reduced.

6. The introduction of Br by $ZnBr_2$ could complex with $I_2$ to form $I_2Br^-$ that inhibit the precipitation of $I_2$ when the battery operates at high SOC and high current density, which greatly improves the cycling stability of the battery.

EMBODIMENTS

Figure 1:
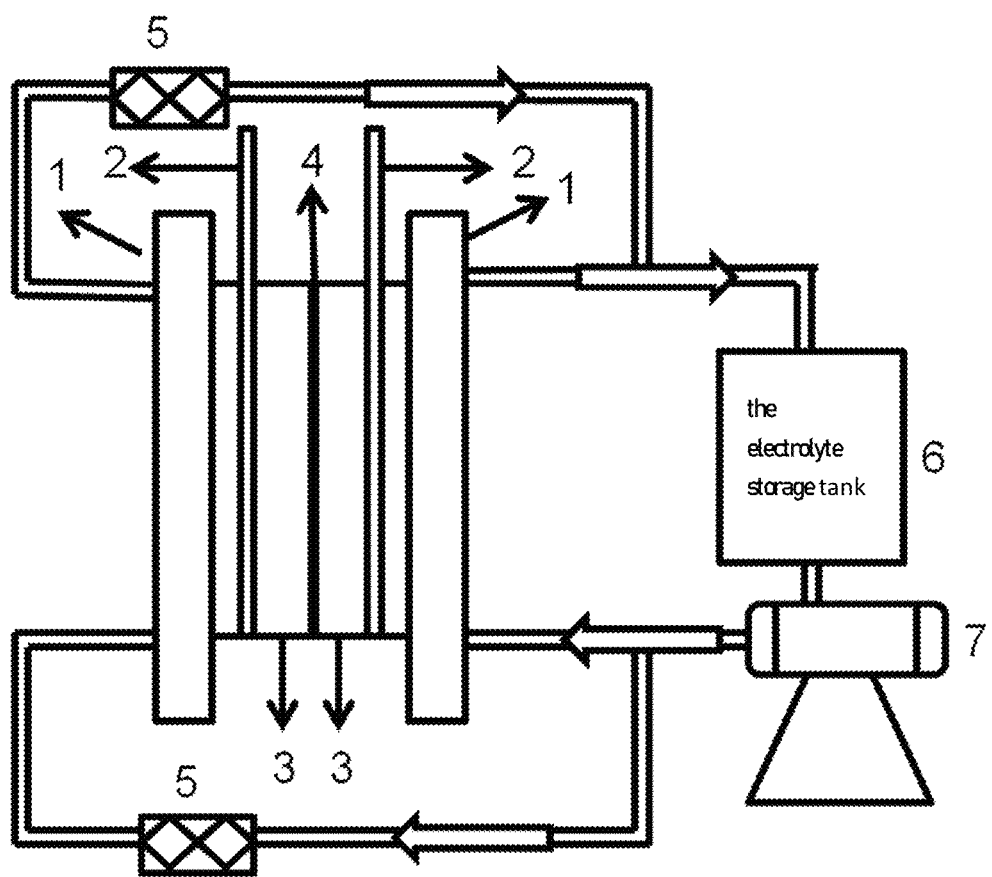
FIG. 1 is the structural diagram of the zinc iodine single flow battery of the invention. Among them, 1 refers to positive and negative bipolar plates; 2 refers to positive and negative current collectors; 3 refers to positive and negative flow frames; 4 is the membrane; 5 refers to positive electrolyte inlet and outlet valves; 6 is the electrolyte storage tank; 7 is pump.

The evaluation of zinc iodine dual-flow battery and single flow battery: the structure of the single battery include, sequentially, positive electrode plate, current collector, carbon felt positive electrode with flow frame, membrane, carbon felt negative electrode with a flow frame, and negative end plate. The flow rate of the electrolyte in the battery was 10 mL/min, the charging current density was 80 mA/cm$^2$, the battery was terminated by the capacity and voltage double cut-off: the charging time was 45 minutes and the voltage was 1.5 V, discharging cut-off voltage was 0.1 V.

| Examples | Electrolyte Composition (mol/L) | membrane | Thickness (μm) | CE | VE | EE |
|---|---|---|---|---|---|---|
| 1 | 8M KI, 4M ZnBr$_2$, 1M KCl | PE | 900 | 96% | 80% | 77% |
| 2 | 6M KI, 3M ZnBr$_2$, 1M KCl | PE | 900 | 96% | 81% | 78% |
| 3 | 8M KI, 4M ZnBr$_2$, 1M KCl | PE | 500 | 91% | 80% | 73% |
| 4 | 6M KI, 3M ZnBr$_2$, 1M KCl | PE | 500 | 91% | 81% | 74% |
| 5 | 8M KI, 4M ZnCl$_2$, 1M KCl | PE | 900 | 92% | 71% | 65% |
| 6 | 6M KI, 3M ZnCl$_2$, 1M KCl | PE | 900 | 93% | 70% | 65% |
| 7 | 8M NaI, 4M ZnBr$_2$, 1M KCl | PE | 900 | 88% | 78% | 68% |
| 8 | 6M NaI, 3M ZnBr$_2$, 1M KCl | PE | 900 | 90% | 78% | 70% |
| 9 | 8M KI, 4M ZnBr$_2$ | PE | 900 | 96% | 78% | 75% |
| 10 | 6M KI, 3M ZnBr$_2$ | PE | 900 | 97% | 78% | 76% |
| Preferred example 1 | 8M KI, 4M ZnBr$_2$, 1M KCl | Composite membrane | 900 | 97% | (85%) | (82%) |
| Preferred example 2 | 8M KI, 4M ZnBr$_2$, 1M KCl | Composite membrane | 500 | 96% | (86%) | (81%) |

| Comparative example | Electrolyte Composition (mol/L) | membrane | Thickness (μm) | CE | VE | EE |
|---|---|---|---|---|---|---|
| 1 | ZnI$_2$ 3M | PE | 900 | 90% | 81% | 73% |
| 2 | ZnI$_2$ 4M | PE | 900 | 89% | 78% | 69% |
| 3 | 8M KI, 4M ZnBr$_2$, 1M KCl | Nafion 115 | 125 | 99% | 70% | 69% |
| 4 | 6M KI, 3M ZnBr$_2$, 1M KCl | Nafion 212 | 50 | 99% | 68% | 67% |
| 5 | KI 5M, ZnBr$_2$ 2.5M, 1M KCl | PE | 65 | 74% | 88% | 65% |

Figure 2:
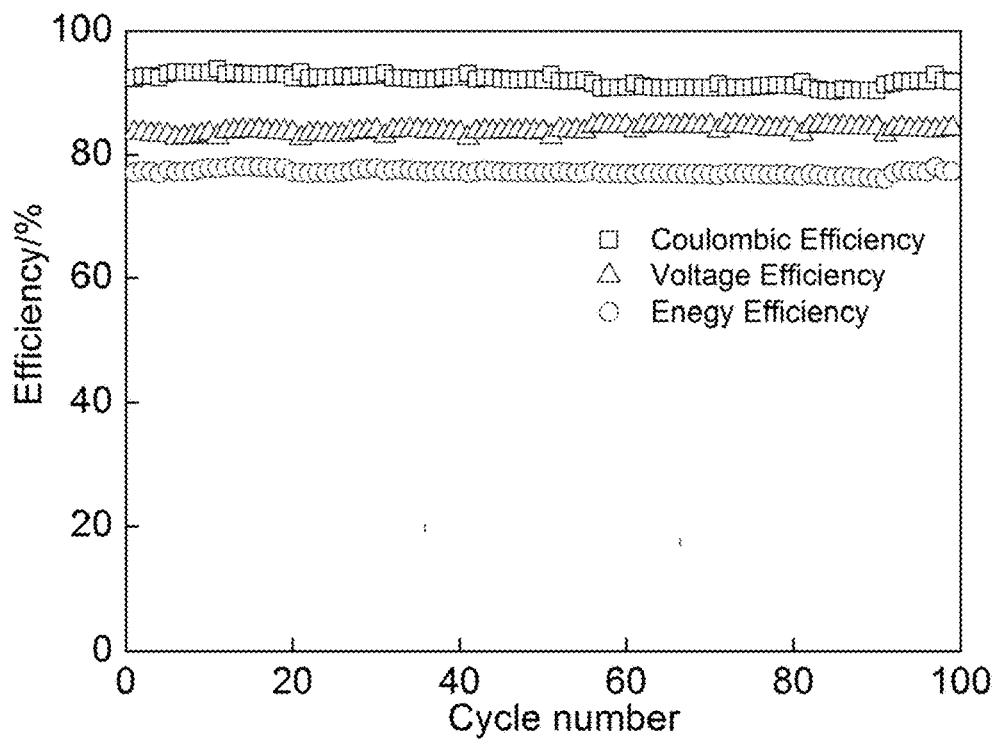
FIG. 2 shows the single battery cycle performance of the zinc iodine single flow battery according to example 1; the positive and negative electrolytes are $ZnBr_2$: 4 M, KI: 8 M, KCl: 1M, and the porous membrane with the thickness of 900 μm.
Figure 3:
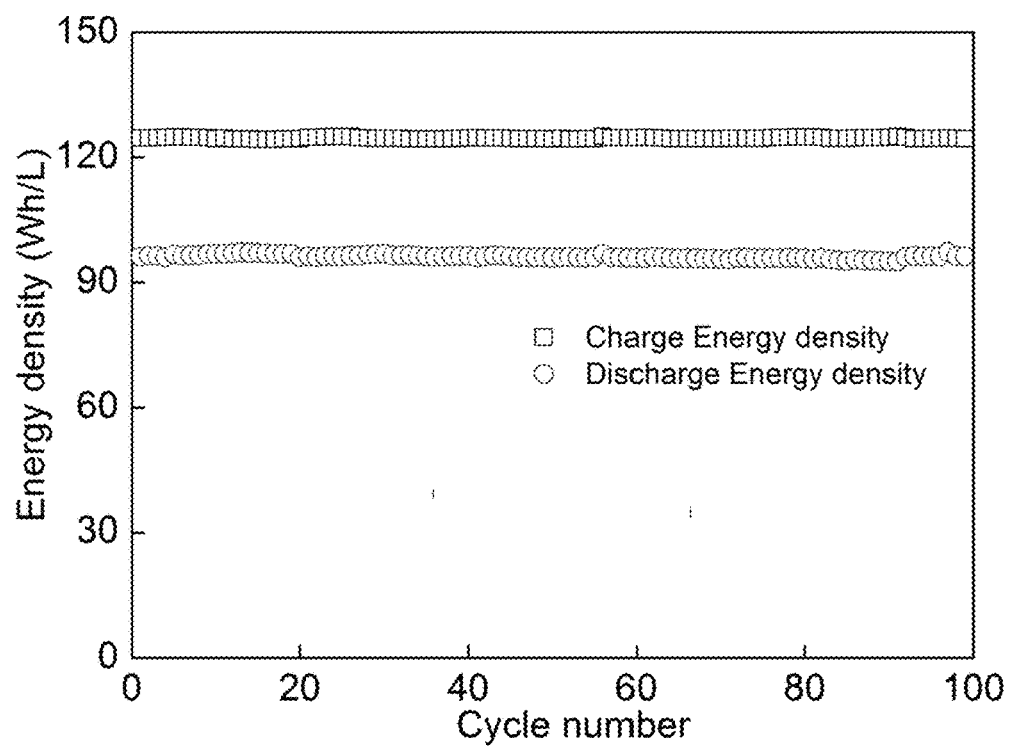
FIG. 3 shows the energy density of the zinc iodine single flow battery according to example 1; the positive and negative electrolyte is $ZnBr_2$: 4 M, KI: 8 M, KCl: 1 M, and the porous membrane with the thickness of 900 μm.

FIGS. 2 to 3 are graphs of cycle performance and energy density of the battery under the most preferred conditions. With KI/ZnBr$_2$ as the electrolyte, the battery assembled with porous membrane achieved excellent cycle stability. Meanwhile, the application of porous membrane greatly improved the ion conductivity, the working current density of the battery can reach 80 mA/cm$^2$ with the high power density. At the same time, the concentration of KI in the electrolyte can reach about 8 M and the energy density is greater than 90 Wh/L.

Figure 4:
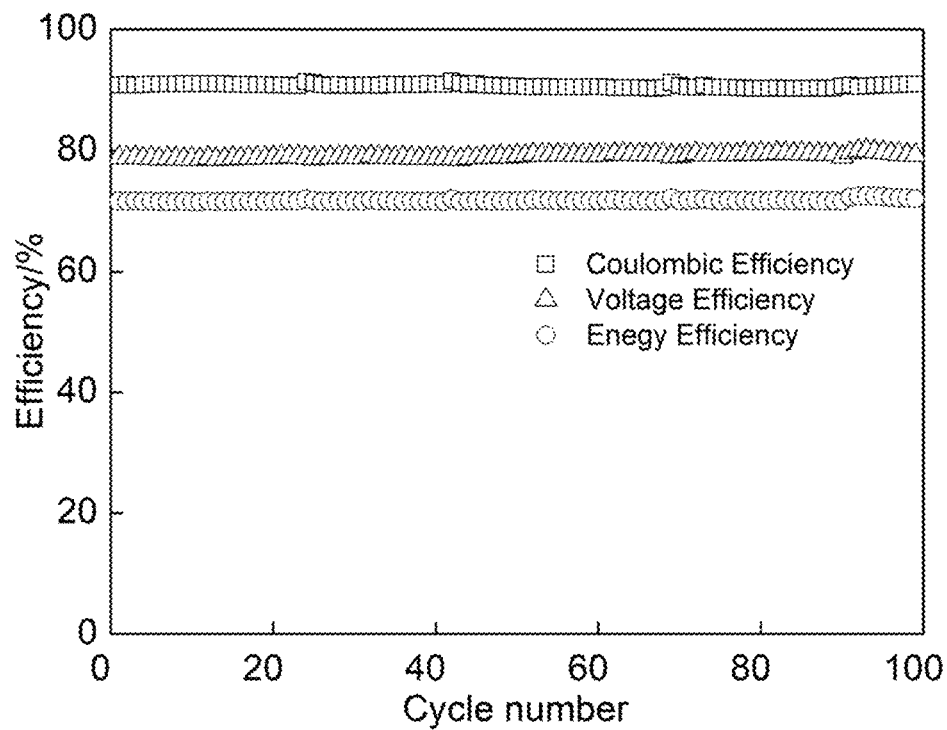
FIG. 4 shows the cycle performance of the zinc iodine single flow battery according to example 3; the positive and negative electrolyte is $ZnBr_2$: 4 M, KI: 8 M, KCl: 1 M, and the porous membrane thickness: 500 μm.
Figure 5:
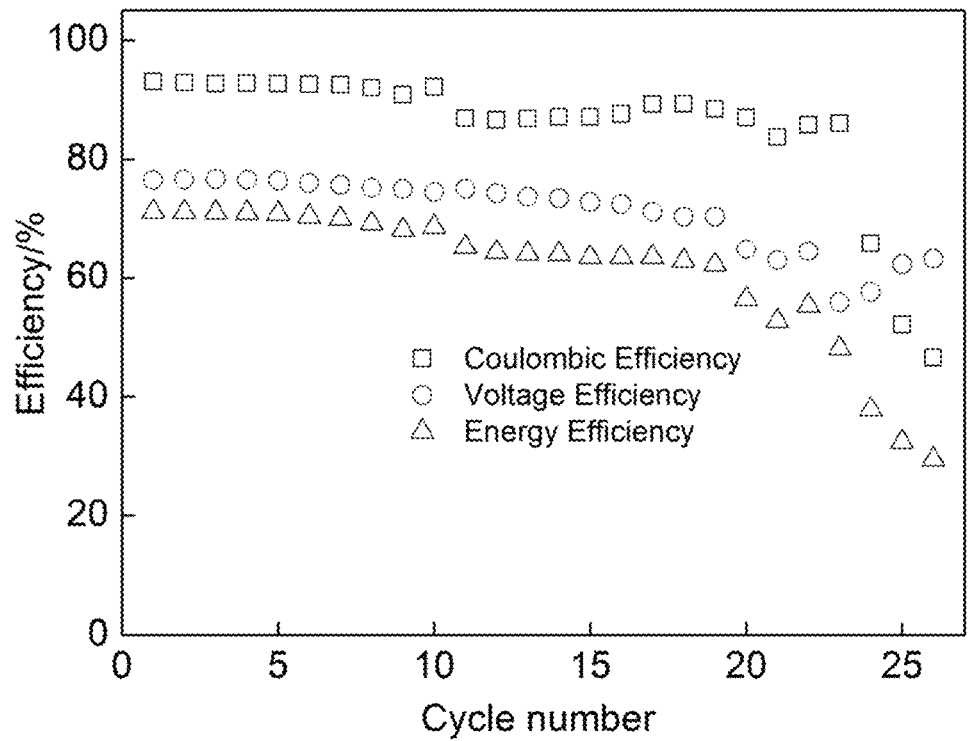
FIG. 5 shows the cycle performance of the zinc iodine single flow battery according to example 5; the positive and negative electrolyte is $ZnCl_2$: 4 M, KI: 8 M, KCl: 1 M, and the porous membrane thickness: 900 μm.
Figure 6:
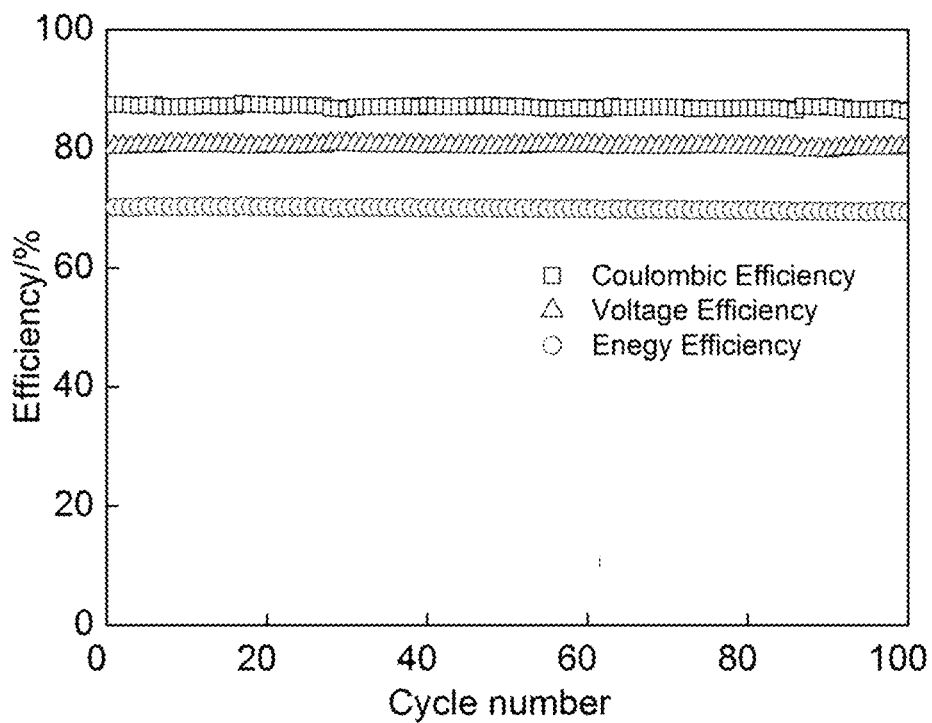
FIG. 6 shows the cycle performance of the zinc iodine single flow battery according to Example 7; the positive and negative electrolyte is $ZnBr_2$: 4 M, NaI: 8 M, KCl: 1 M, and the porous membrane thickness: 900 μm.
Figure 7:
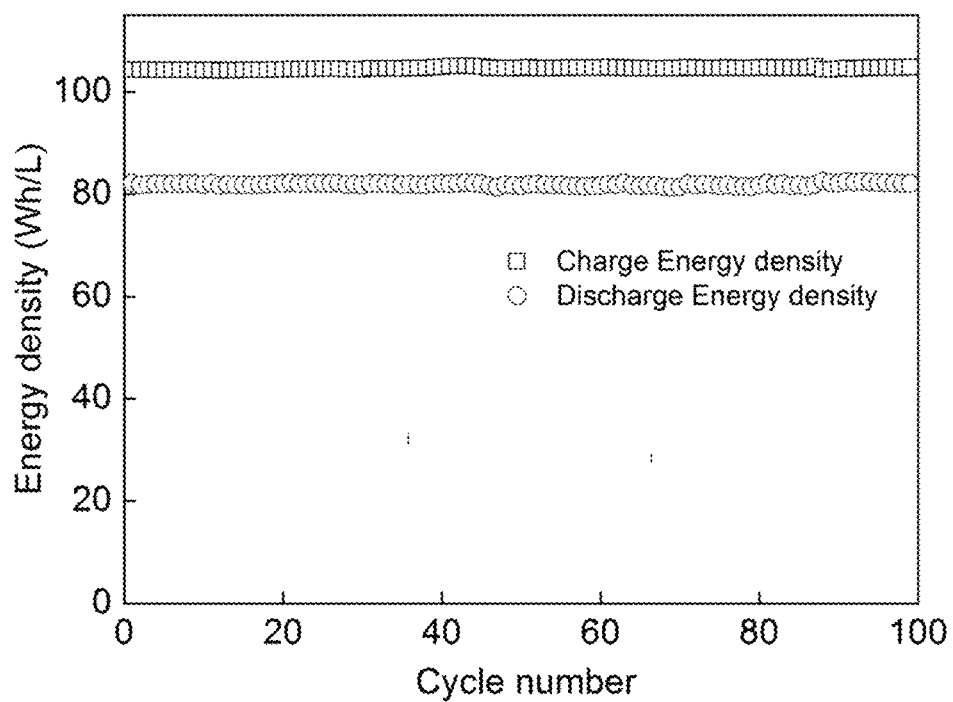
FIG. 7 shows the energy density diagram of the zinc iodine single flow battery according to Example 7; the positive and negative electrolyte is $ZnBr_2$: 4 M, NaI: 8 M, KCl: 1 M, and the porous membrane thickness: 900 μm.

Compared with the most preferred example, the battery in FIG. 4 employs a much thinner porous membrane (500 μm), and the coulombic efficiency of the battery decreases due to the increase of electrolyte crossover. The electrolyte in FIG. 5 employed ZnCl$_2$ rather than ZnBr$_2$, the performance is greatly reduced and the stability is deteriorated. This is due to the instability of the electrolyte; during charging, the I$_2$ desposition formed in the positive electrode and ZnCl$_2$ in the negative electrolyte would hydrolyze and precipitate. In FIG. 6, when NaI was substituted with KI, the battery efficiency decreased. In particular, the voltage efficiency drop is mainly caused by the decrease of the electrolyte conductivity, which further decreased the energy density of the battery in FIG. 7.

Figure 8:
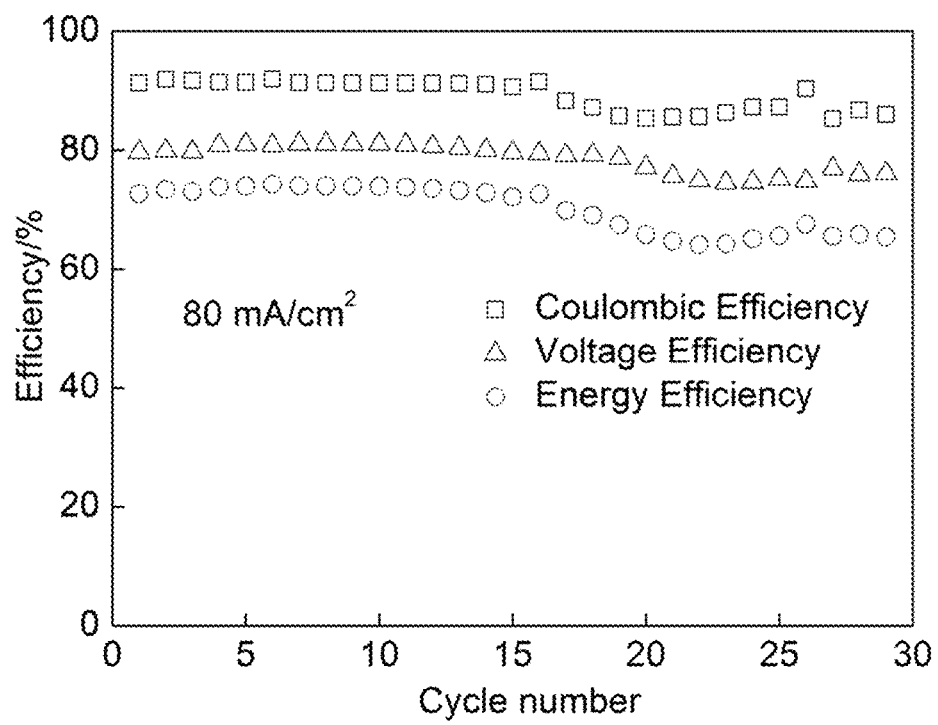
FIG. 8 shows the cycle performance of the zinc iodine single flow battery according to comparative example 2; the positive and negative electrolyte is $ZnI_2$: 4 M, porous membrane thickness: 900 μm.
Figure 9:
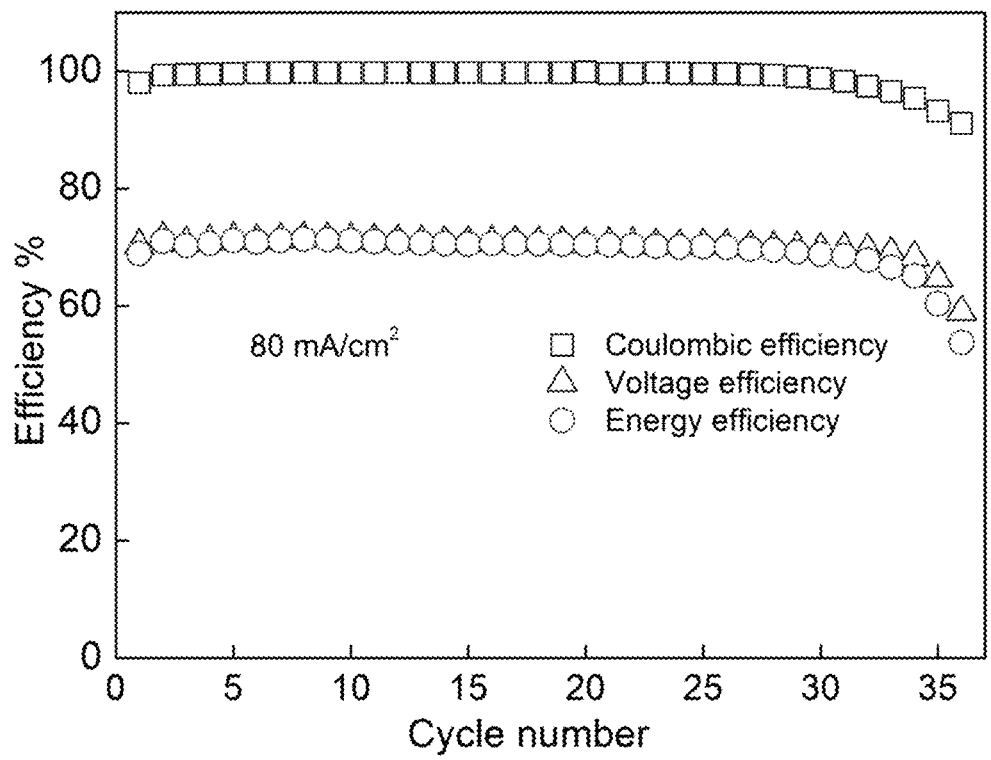
FIG. 9 shows the cycle performance of the zinc iodine single flow battery according to comparative example 3; the positive and negative electrolytes are $ZnBr_2$: 4 M, NaI 8 M, KCl: 1 M, Nafion 115 film thickness: 125 μm.
Figure 10:
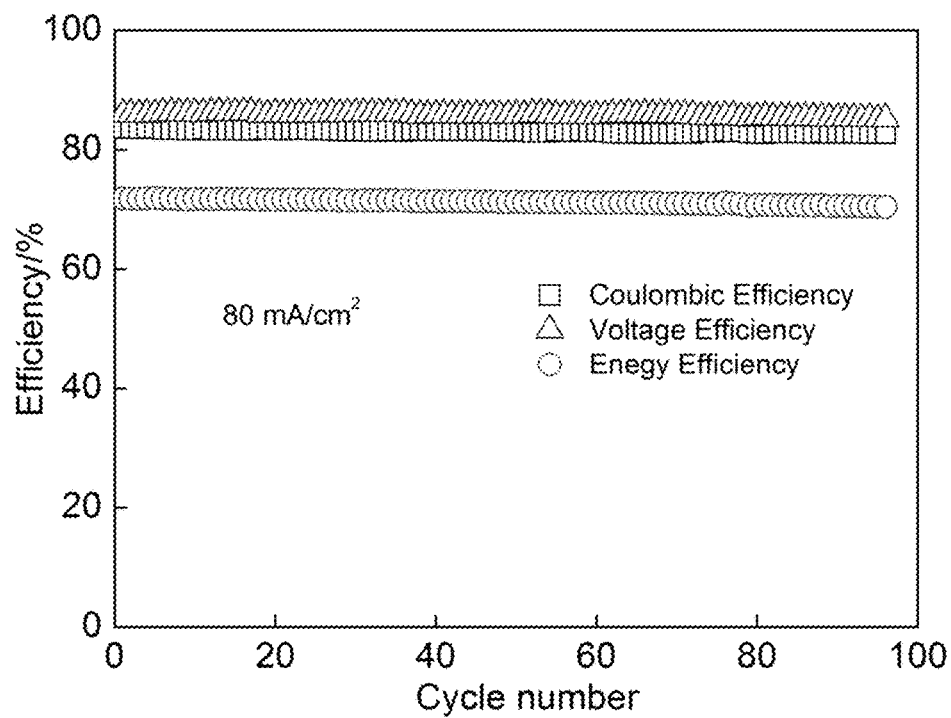
FIG. 10 shows the cycle performance of the zinc iodine single flow battery according to comparative example 5; the positive and negative electrolyte is $ZnBr_2$: 4 M, NaI 8 M, KCl: 1 M, and the porous film thickness is 65 μm.
Figure 11:
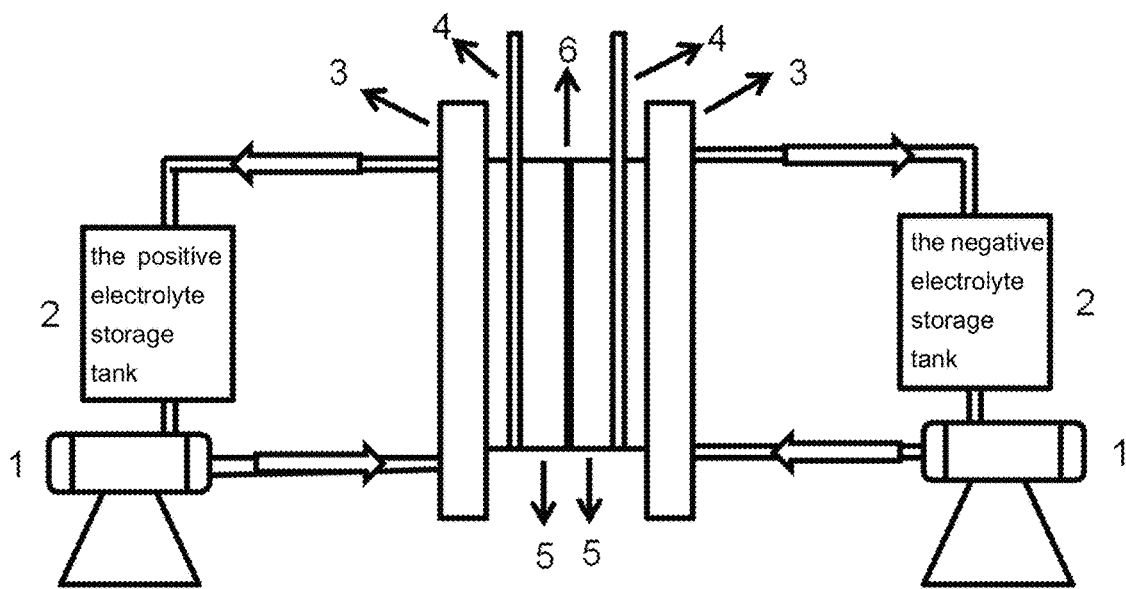
FIG. 11 is the structural diagram of zinc iodine dual-flow battery using porous membrane: 1 refers to the positive and negative pumps; 2 refers to the positive and negative electrolyte storage tank; 3 refers to the positive and negative end plates; 4 refers to the positive and negative current collectors; 5 refers to the positive and negative flow frames; 6 is the membrane.
Figure 12:
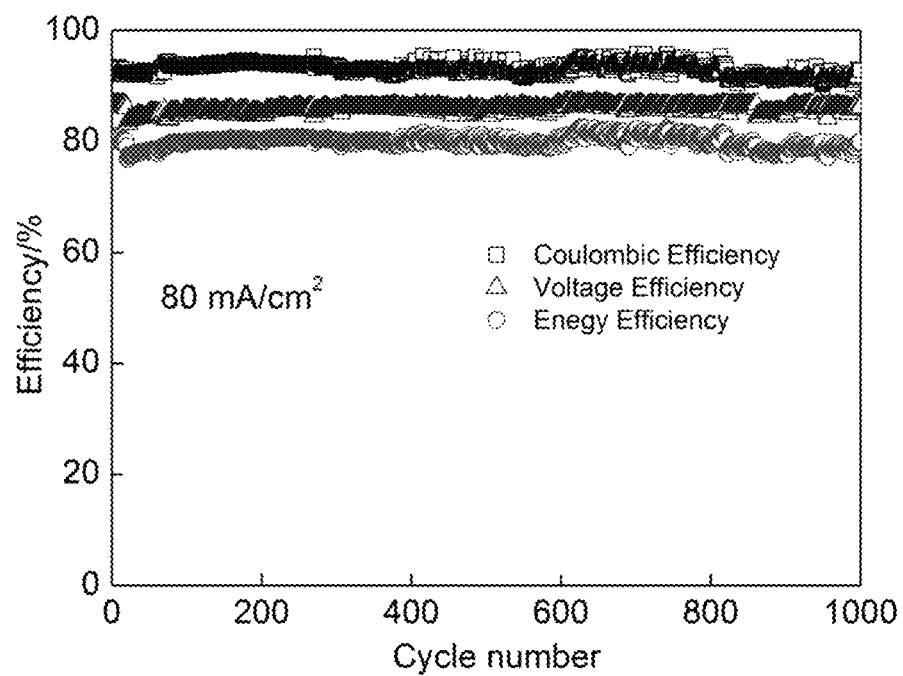
FIG. 12 shows the single battery cycle performance diagram of the zinc iodine dual-flow battery according to example 1; the positive and negative electrolyte is $ZnBr_2$: 2.5 M, KI: 5 M, KCl: 1 M, and the porous membrane thickness is 900 μm.
Figure 13:
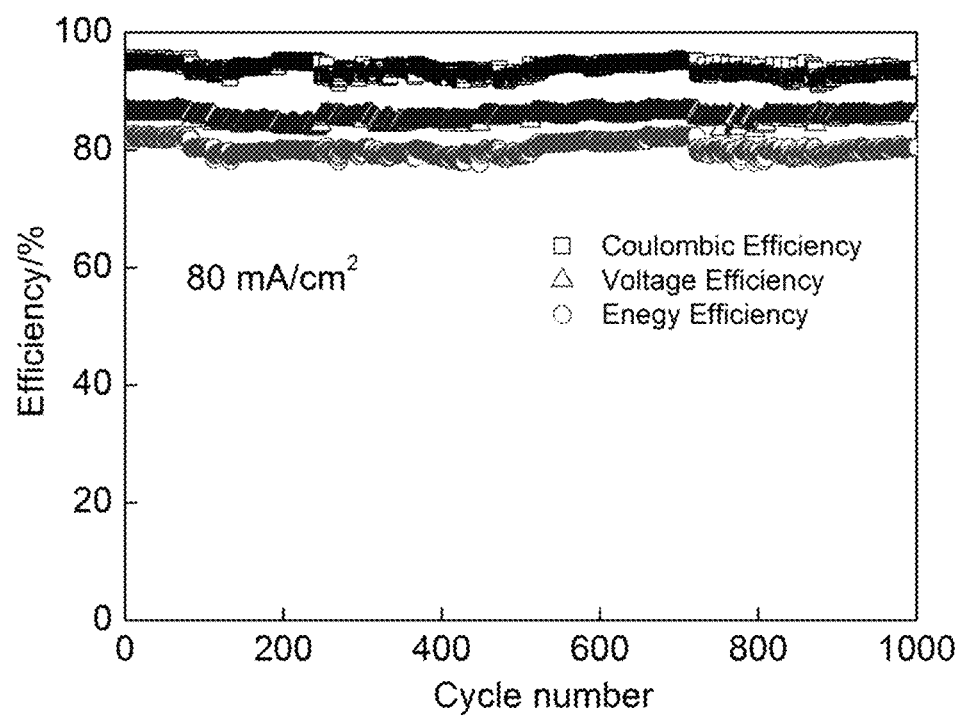
FIG. 13 shows the single battery cycle performance diagram of the zinc iodine dual-flow battery according to example 2; the positive and negative electrolyte is $ZnBr_2$: 3 M, KI: 6 M, KCl: 1M, the porous membrane thickness is 900 μm.
Figure 14:
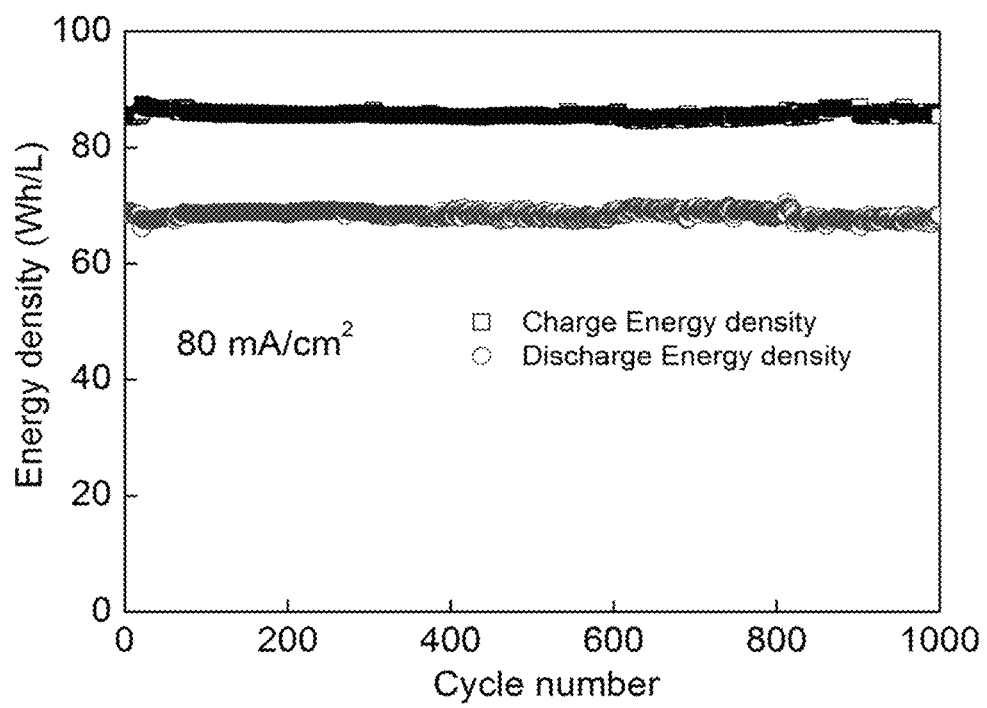
FIG. 14 shows the energy density diagram of the single cell of the zinc iodine dual-flow battery according to example 1; the positive and negative electrolyte is $ZnBr_2$: 2.5 M, KI: 5 M, KCl: 1 M: 1 m, the porous membrane thickness is 900 μm.
Figure 15:
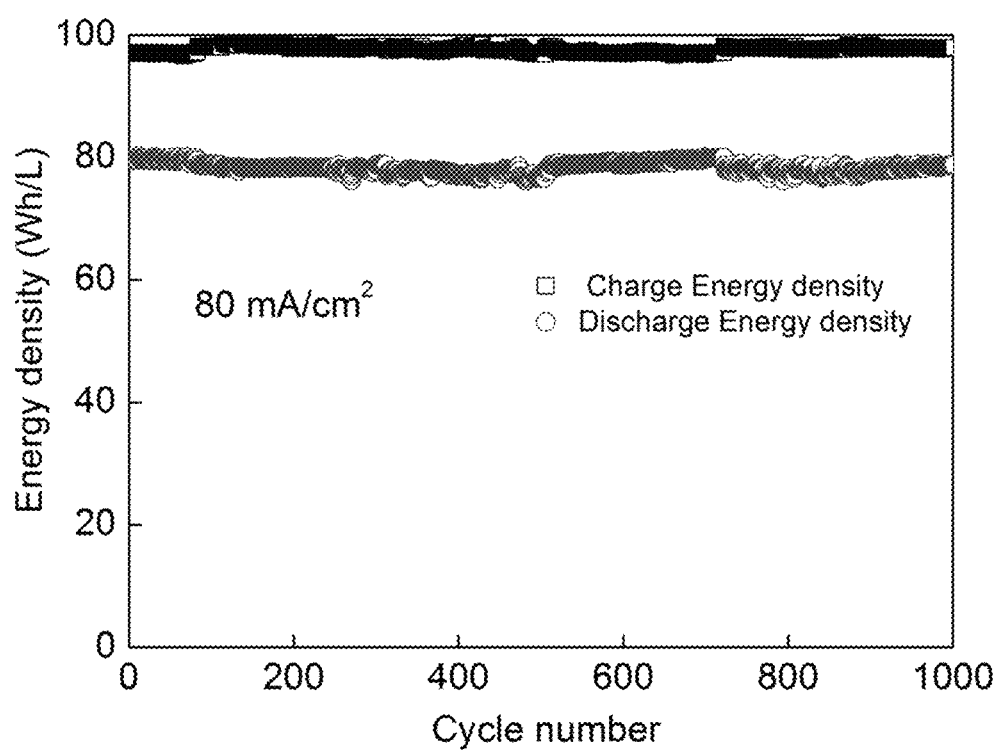
FIG. 15 shows the energy density diagram of the single cell of the zinc iodine dual-flow battery according to example 2; the positive and negative electrolyte is $ZnBr_2$: 3 M, KI: 6 M, KCl: 1M, the porous membrane thickness is 900 μm.
Figure 16:
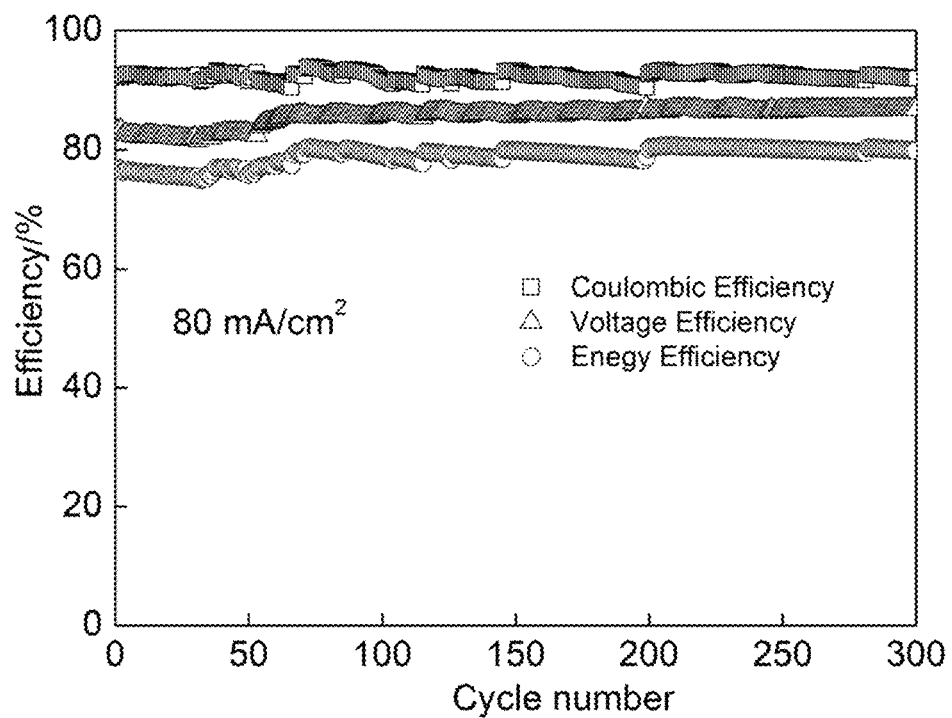
FIG. 16 shows the single battery cycle performance diagram of the zinc iodine dual-flow battery according to example 3; the positive and negative electrolyte is $ZnBr_2$: 2 m, KI: 4 M, KCl: 1 M, the porous membrane thickness is 900 μm.
Figure 17:
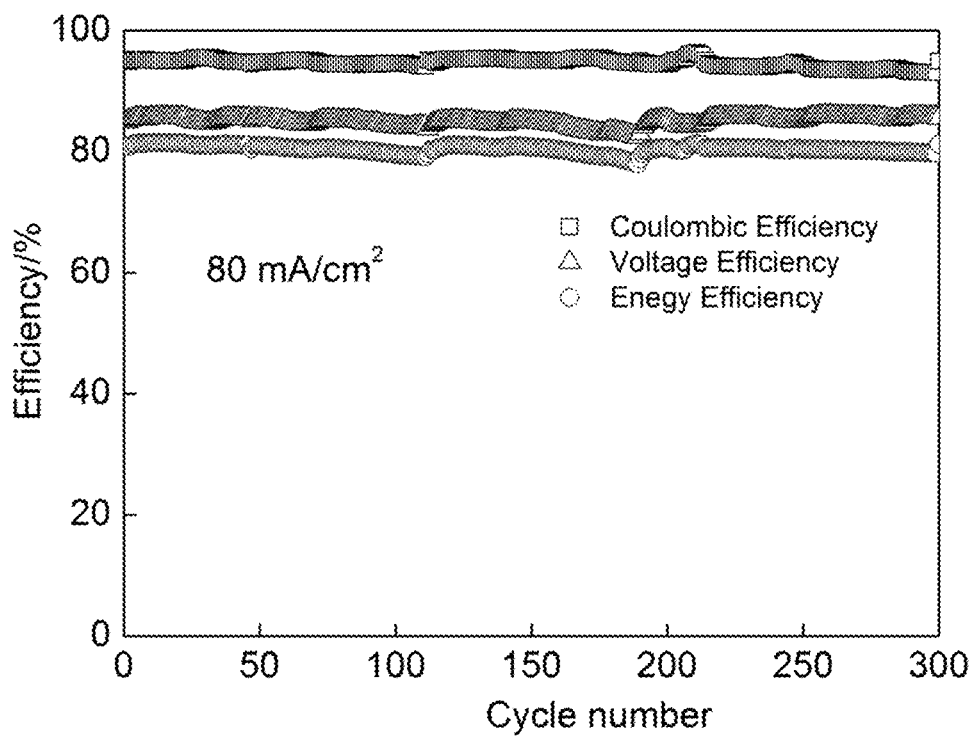
FIG. 17 shows the single cell cycle performance diagram of the zinc iodine dual-flow battery according to example 4; the positive and negative electrolyte is $ZnBr_2$: 1 M, KI: 2 M, KCl: 1 M, the porous membrane thickness is 900 μm.

FIGS. 8-10 are comparative experiments. FIG. 8 employed ZnI$_2$ as the electrolyte of the battery. The decrease of efficiency was mainly due to the low ion conductivity of the ZnI$_2$ solution. Further, the battery performance is unstable due to the precipitation of electrolyte. FIG. 9 employed Nafion 115 membrane for the battery assembly. During the charge and discharge process, serious membrane fouling occurred on the membrane surface, which intensified the battery polarization and decreased the battery performance. FIG. 10 used a much thinner porous membrane, the cross-contamination of electrolyte was greatly intensified, and the efficiency of the battery, especially the coulomb efficiency, was severely reduced.

Figure 29:
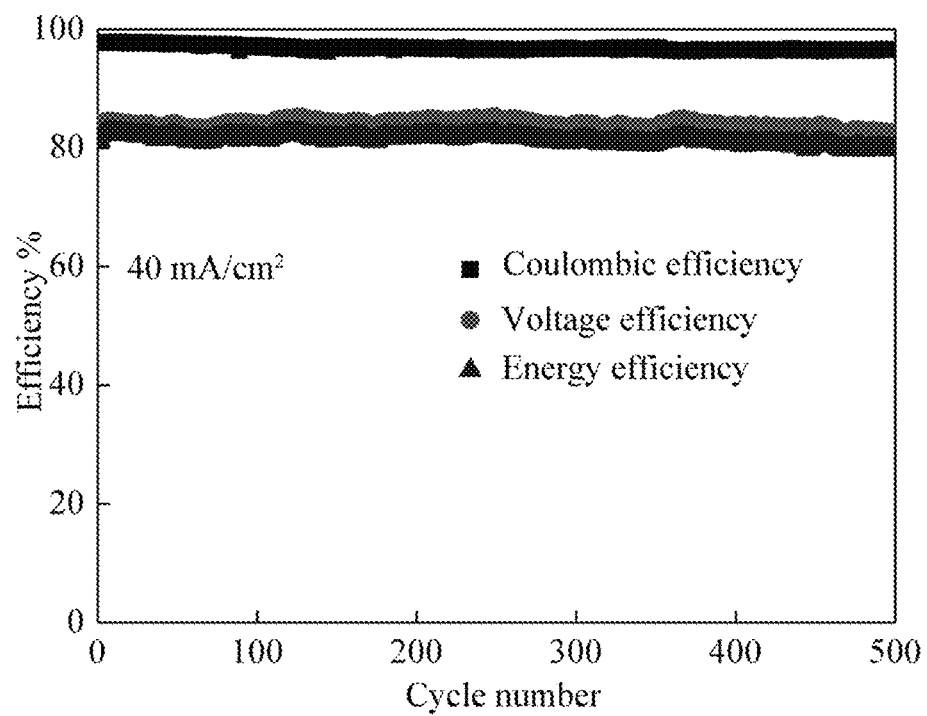
FIG. 29 is the cycle performance diagram of a single cell zinc iodine single flow battery according to preferred example 1; the positive and negative electrolyte is $ZnBr_2$: 4 M, KI: 8M, KCl: 1 M, the composite membrane is PE porous membrane substrate with 7 μm Nafion resin coating.
Figure 30:
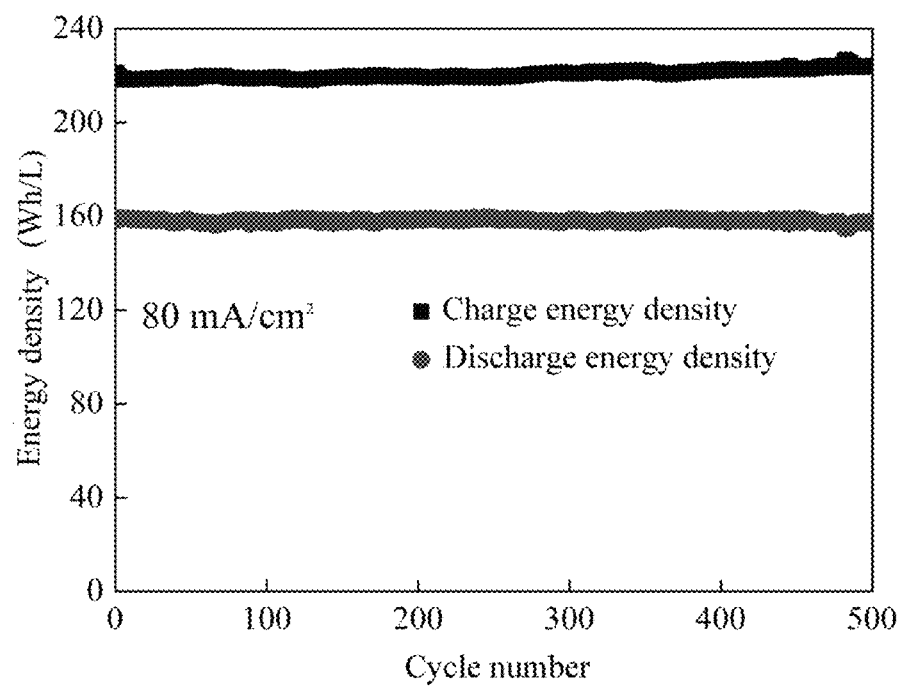
FIG. 30 is the energy density diagram of zinc iodine single flow battery according to preferred example 1; the positive and negative electrolyte is $ZnBr_2$: 4 M, KI: 8 M, KCl: 1 M, the composite membrane is PE porous substrate with 7 μm Nafion resin coating.
Figure 31:
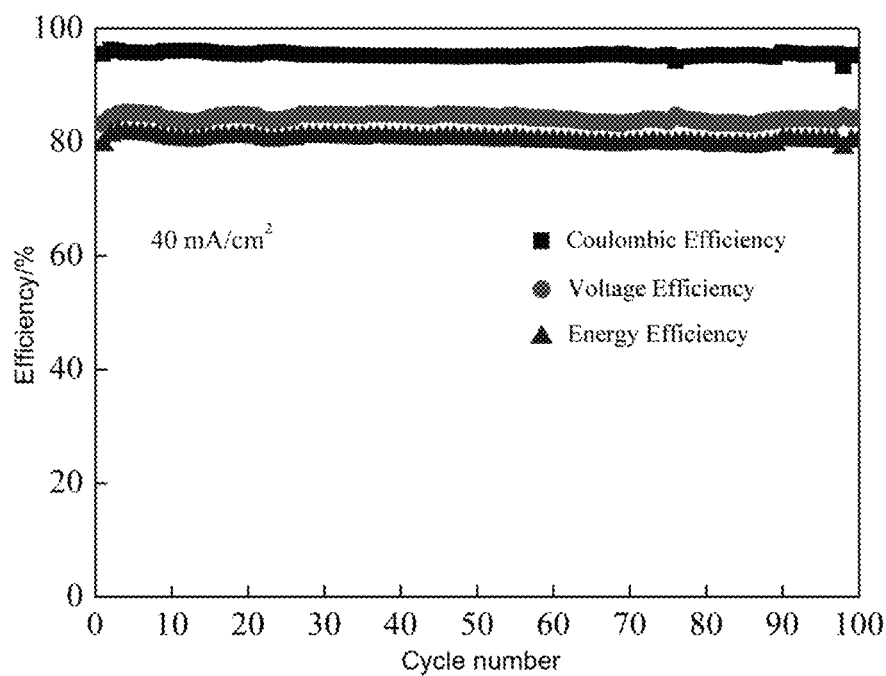
FIG. 31 shows the cycle performance diagram of the zinc iodine single flow battery according to preferred example 2; the positive and negative electrolyte is $ZnBr_2$: 4 M, KI: 8 M, KCl: 1 M, the composite membrane is PE porous substrate with 7 μm Nafion resin coating.

A preferred example employed a Nafion-coated composite membrane as the membrane. FIG. 29 shows the performance of a battery that used composite membrane with the thickness of 900 μm. The electrolyte was a mixed solution of KI and ZnBr$_2$. Due to the Donnan exclusion of Nafion coating, the columbic efficiency of the battery was greatly improved. In addition, the battery used a thinner composite membrane (500 μm), and the coulombic efficiency of the battery slightly decreased.

The evaluation of zinc-iodine dual-flow battery and single flow battery: the structure of a single battery contains, sequentially: a positive electrode plate, a current collector, a carbon felt positive electrode with a flow frame, a membrane, and a battery with a flow frame, a carbon felt negative electrode with a flow frame, and a negative end plate. The flow rate of the electrolyte in the battery was 10 mL/min, the battery was terminated by the capacity and voltage double cut-off: the charging cut-off time was 45 minutes and the voltage was 1.5 V, discharging cut-off voltage was 0.1 V

| Examples | Electrolyte (mol/L) | membrane | Thickness (μm) | CE | VE | EE |
|---|---|---|---|---|---|---|
| 1 | KI 5M, $ZnBr_2$ 2.5M, 1M KCl | PE | 900 | 94% | 85% | 80% |
| 2 | KI 6M, $ZnBr_2$ 3M, 1M KCl | PE | 900 | 94% | 85% | 80% |
| 3 | KI 4M, $ZnBr_2$ 2M, 2M KCl | PE | 900 | 94% | 85% | 80% |
| 4 | KI 2M, $ZnBr_2$ 1M, 2M KCl | PE | 900 | 94% | 86% | 81% |
| 5 | KI 5M, $ZnBr_2$ 2.5M, 1M KCl | PE | 500 | 87% | 86% | 75% |
| 6 | KI 6M, $ZnBr_2$ 3M, 1M KCl | PE | 500 | 86% | 86% | 74% |
| 7 | NaI 5M, $ZnBr_2$ 2.5M, 1M KCl | PE | 900 | 94% | 83% | 78% |
| 8 | NaI 6M, $ZnBr_2$ 3M, 1M KCl | PE | 900 | 94% | 82% | 77% |
| 9 | KI 5M, $ZnCl_2$ 2.5M, 1M KCl | PE | 900 | 91% | 82% | 75% |
| 10 | KI 6M, $ZnCl_2$ 3M, 1M KCl | PE | 900 | 90% | 81% | 72% |
| 11 | KI 5M, $ZnSO_4$ 2.5M, 1M KCl | PE | 900 | 76% | 81% | 61% |
| 12 | KI 6M, $ZnSO_4$ 3M, 1M KCl | PE | 900 | 75% | 80% | 60% |
| 13 | KI 5M, $ZnBr_2$ 2.5M | PE | 900 | 95% | 83% | 79% |
| 14 | KI 6M, $ZnBr_2$ 3M | PE | 900 | 95% | 83% | 79% |

| Comparative example | Electrolyte (mol/L) | membrane | Thickness (μm) | CE | VE | EE |
|---|---|---|---|---|---|---|
| 1 | KI 5M, $ZnBr_2$ 2.5M, 1M KCl | Nafion 115 | 125 | 99% | 81% | 80% |
| 2 | KI 5M, $ZnBr_2$ 2.5M, 1M KCl | Nafion 212 | 50 | 98% | 83% | 81% |
| 3 | $ZnI_2$ 2.5M | PE | 900 | 99% | 71% | 70% |
| 4 | $ZnI_2$ 3M | PE | 900 | 98% | 70% | 68% |
| 5 | KI 5M, $ZnBr_2$ 2.5M, 1M KCl | PE | 65 | 74% | 88% | 65% |

FIG. 11-17 show zinc iodine dual-flow batteries that employed $ZnBr_2$ and KI as the active substance, KCl as the supporting electrolyte with a 900 μm porous membrane. The battery can continuously run stably for more than 1000 cycles at 80 mA/cm². Above all, the energy efficiency is greater than 80% with the energy density above 80 Wh/L. The advantages of the above system include: the introduction of Bf in $ZnBr_2$ can form a complex agent of $I_2Br^-$, thereby inhibiting the precipitation of $I_2$; the replacement of traditional $ZnI_2$ with KI can avoid the formation of zinc oxide and hydroxide during the charge and discharge process. The employment of porous membranes benefit the conduction of neutral ions, which improves the operating current density and power density of the battery. In addition, the absence of ion exchange groups in the membrane can greatly reduce the membrane fouling issue and improve the cycle stability of the battery.

Figure 18:
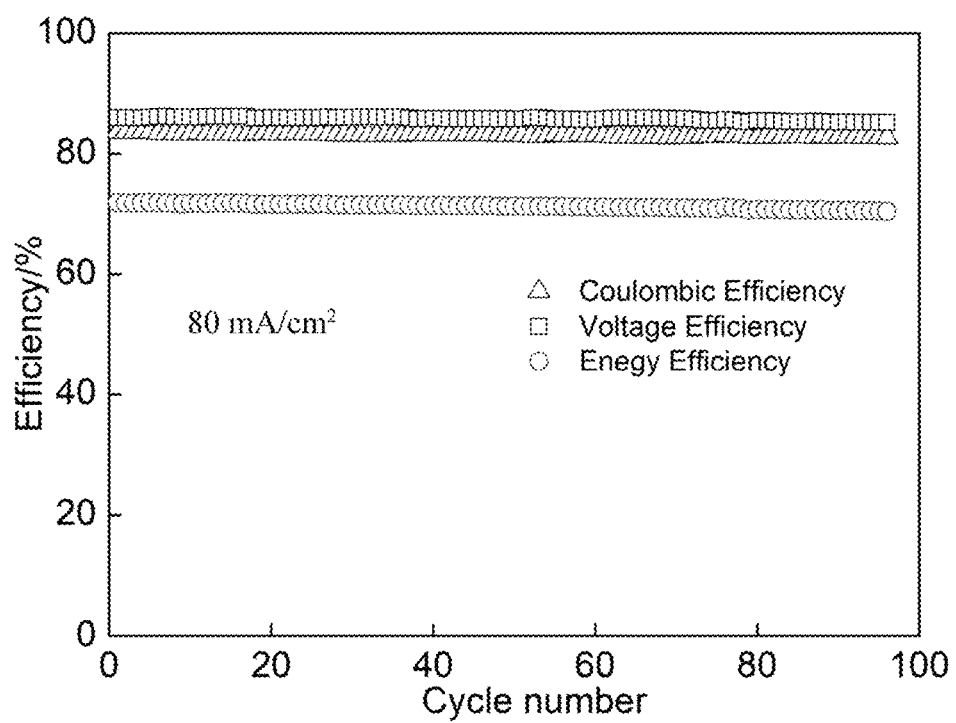
FIG. 18 shows the single battery cycle performance diagram of the zinc iodine dual-flow battery according to example 6; the positive and negative electrolyte is $ZnBr_2$: 3 M, KI: 6 M, KCl: 1 M, and the thickness of the porous membrane is 500 μm.
Figure 19:
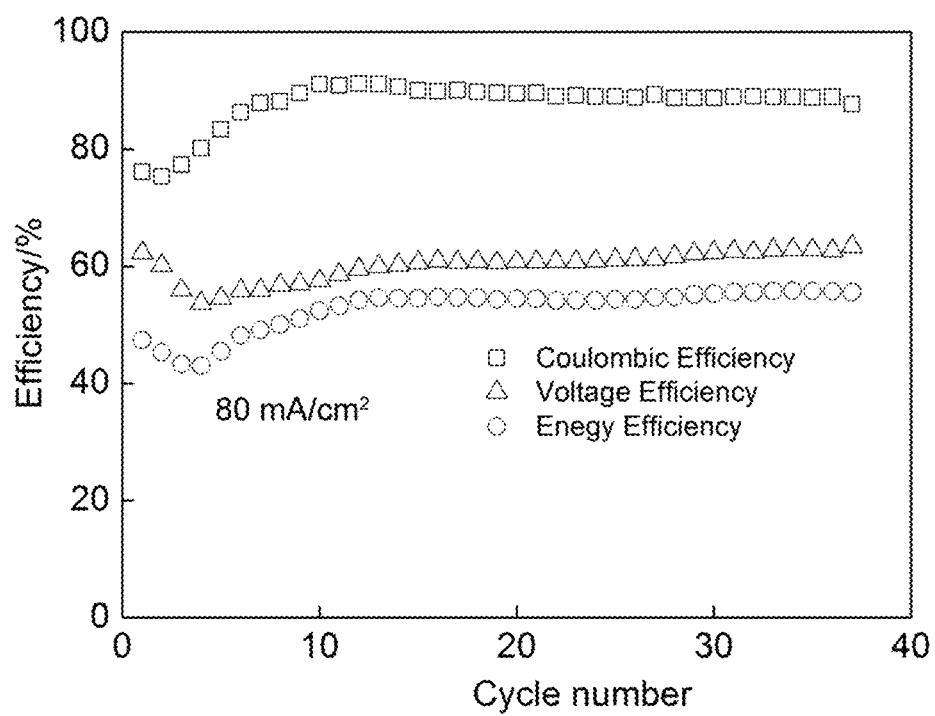
FIG. 19 shows the single battery cycle performance of the zinc iodine dual-flow battery according to example 12; the positive and negative electrolyte is $ZnSO_4$: 3 M, KI: 6 M, KCl: 1 M, and the thickness of the porous membrane is 900 μm.
Figure 20:
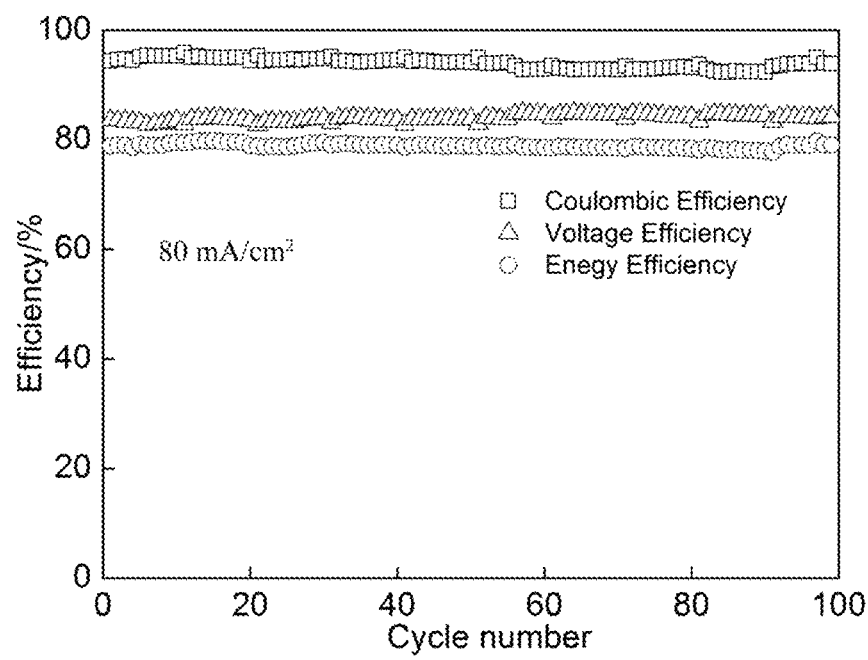
FIG. 20 single battery cycle performance diagram of zinc iodine dual-flow battery according to example 14; positive and negative electrolyte is $ZnBr_2$: 3 M, KI: 6 M, and the thickness of porous membrane is 900 μm.
Figure 21:
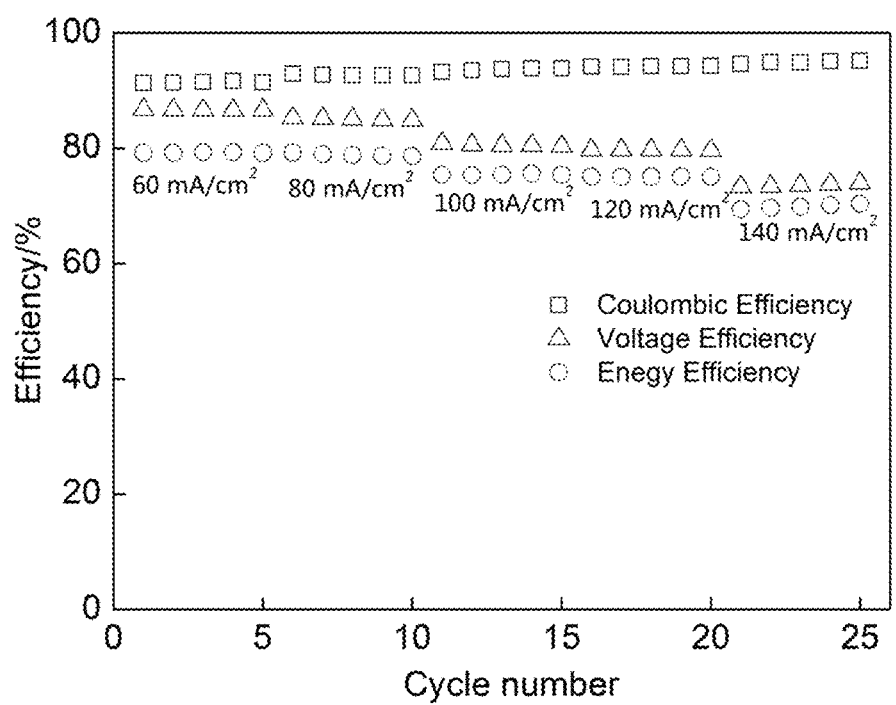
FIG. 21 demonstrates the ratio performance diagram of zinc iodine dual-flow battery according to example 4; the structure of the single cell battery includes successively: positive end plate, positive current collector, positive flow frame, membrane, negative flow frame and negative end plate. The composition of electrolyte in the battery is 2 M KI, 1 M $ZnBr_2$, and 2 M KCl, flow rate is 10 ml/min, charging current density is 60-140 mA/cm$^2$, the battery is terminated by the capacity and voltage double cut-off: the charging cut-off time is 45 minutes and the voltage is 1.5 V, discharging cut-off voltage is 0.1 V.
Figure 22:
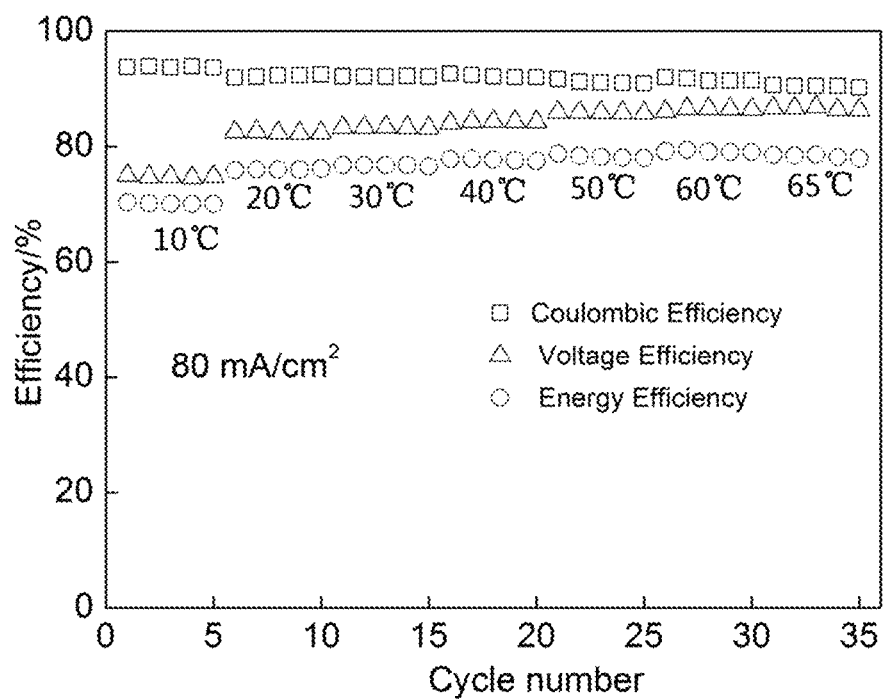
FIG. 22 is a temperature dependent performance diagram of the zinc iodine dual-flow battery assembled in example 4. Battery temperature dependent performance test: the structure of the single battery is as follows: positive end plate, positive current collector, positive flow frame, membrane, negative flow frame and negative end plate. The composition of electrolyte in the battery is 2 M KI, 1 M $ZnBr_2$, and 2 M KCl, flow rate is 10 ml/min, charging current density is 80 mA/cm$^2$, the battery is terminated by the capacity and voltage double cut-off: the charging cut-off time is 45 minutes and the voltage is 1.5 V, discharging cut-off voltage is 0.1 V, temperature range is 10° C.-65° C.
Figure 23:
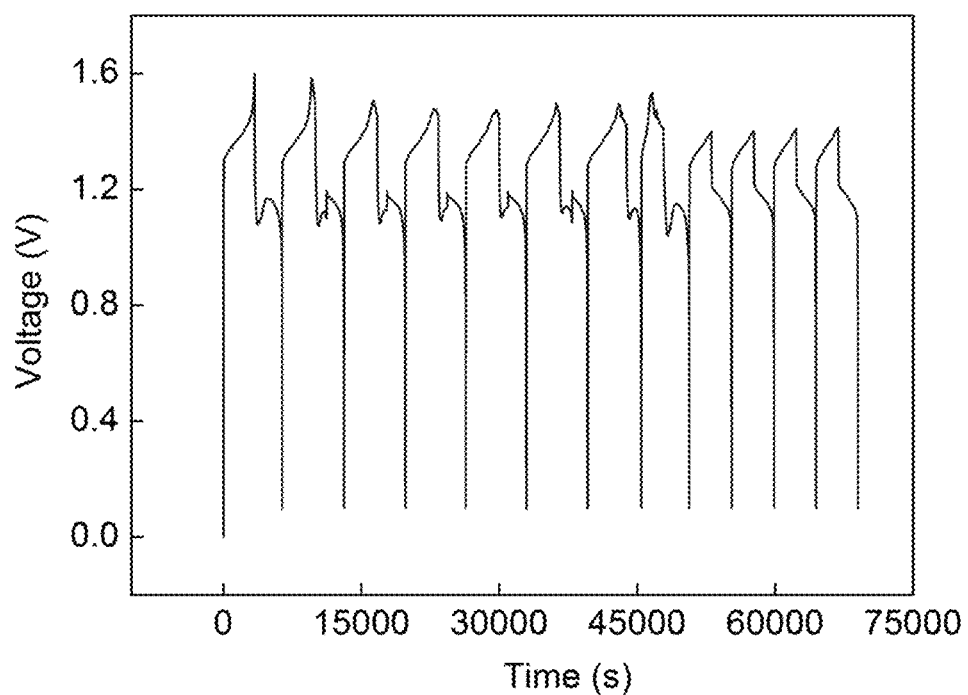
FIG. 23 demonstrates the voltage curve of a single zinc-iodine dual-flow battery according to example 2. The structure of the single battery is as follows: positive end plate, positive current collector, positive flow frame, membrane, negative flow frame and negative end plate. The composition of electrolyte in the battery is 6 M KI, 3 M $ZnBr_2$, and 1 M KCl flow rate is 10 ml/min, charging current is 80 mA/cm$^2$, the battery is terminated by the capacity and voltage double cut-off: the charging cut-off time is 45 minutes and the voltage is 1.5 V, discharging cut-off voltage is 0.1 V. Charge for 1 hour until the battery is short circuited, then reduce the charging time to 45 mins to continue the battery cycling.
Figure 24:
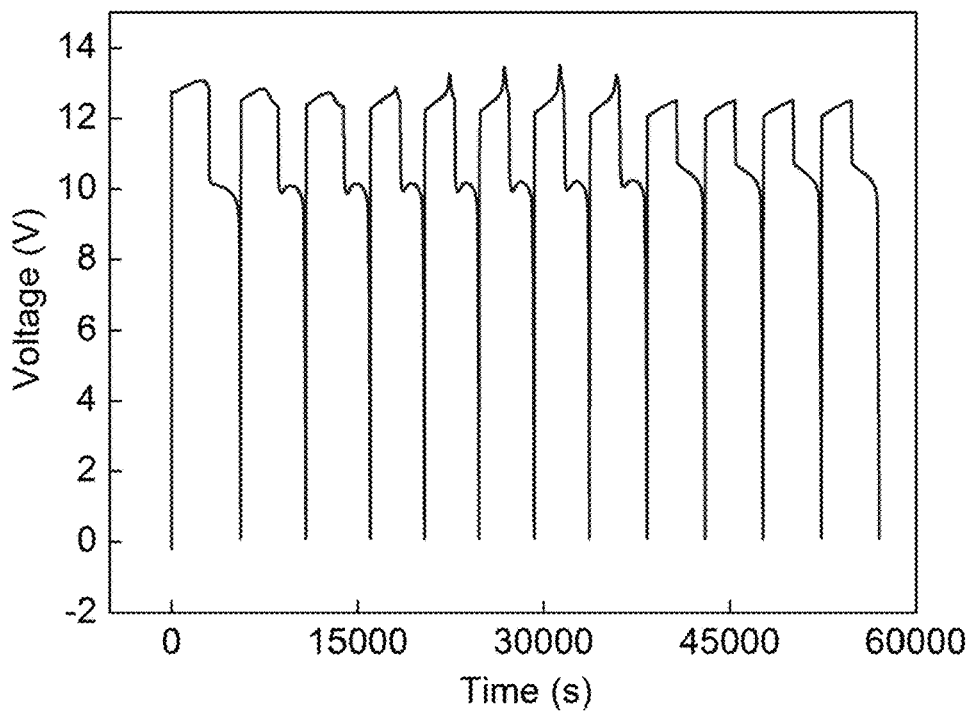
FIG. 24 demonstrates a voltage curve diagram of a zinc-iodine dual-flow battery stack according to example 2. The structure of the stack is: a positive electrode end plate, a current collector, nine batteries each comprises a positive electrode with flow frame, a membrane, a negative electrode with a flow frame, and finally a current collector and a negative electrode end plate connected in series. The electrolyte composition of the battery is 6 M KI, 3 M $ZnBr_2$, and 1 M KCl with a flow rate of 10 mL/min. The charging current density was 80 mA/cm$^2$ and the charge cut-off voltage is 13 V with a discharge cut-off voltage of 1 V. Charge for 1 h until the battery is short-circuited, then reduce the charging time to 45 mins to continuously evaluated the battery.
Figure 25:
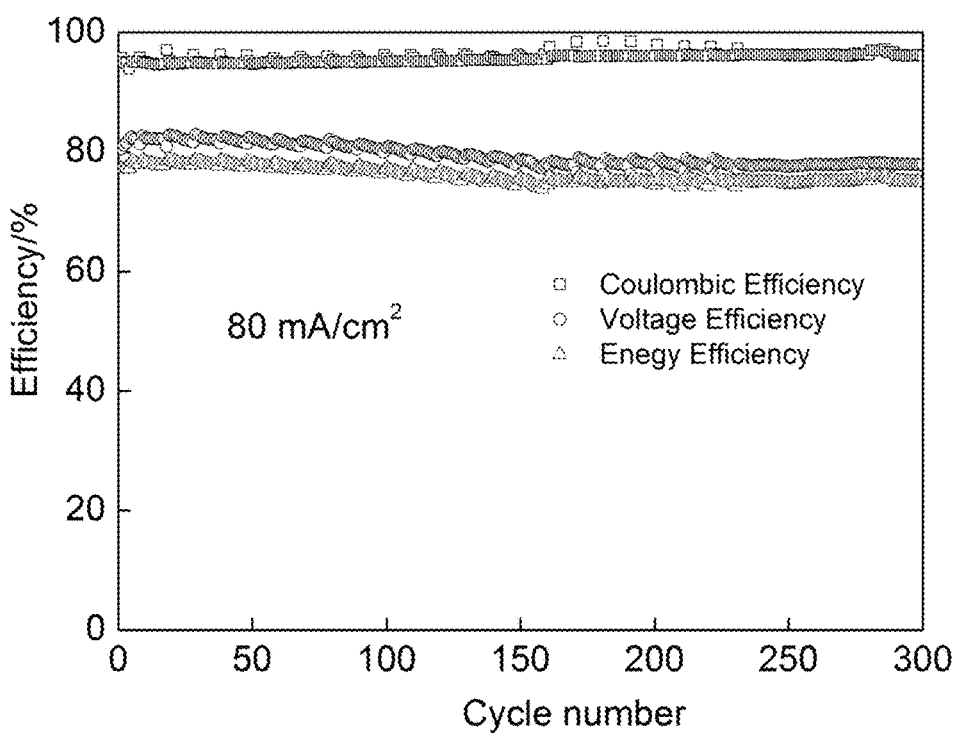
FIG. 25 is the cyclic performance diagram of the zinc iodine dual-flow battery stack according to example 2; the stack assembled with nine single battery connected in series.

Compared with the most preferred example: FIG. 18 employs a thinner porous membrane which resulted in a drop of performance especially the coulomb efficiency. This is mainly due to the employment of a thinner membrane that lead to much more serious cross-contamination. In FIG. 19, $ZnSO_4$ replaced $ZnBr_2$ and the voltage efficiency of the battery was greatly reduced, which indicates that the sulfate ion affected the electrochemical kinetic of electrolyte; in FIG. 20, when the supporting electrolyte was removed, the voltage efficiency of the battery was reduced slightly. FIGS. 21 to 25 demonstrate that, under preferred conditions, the battery displayed excellent rate performance and temperature dependent performance; in addition, the porous membrane could eliminate the zinc dendrites formed on the negative electrode as the pore structure was filled with oxidized $I_3^-$, which could react with the zinc dendrite. Therefore, the single battery and the battery stack can self-recovered after a micro short circuit occur, which greatly improves the stability of the battery. Most importantly, the battery stack can continuously run stably for more than 300 cycles at 80 mA/cm².

Figure 26:
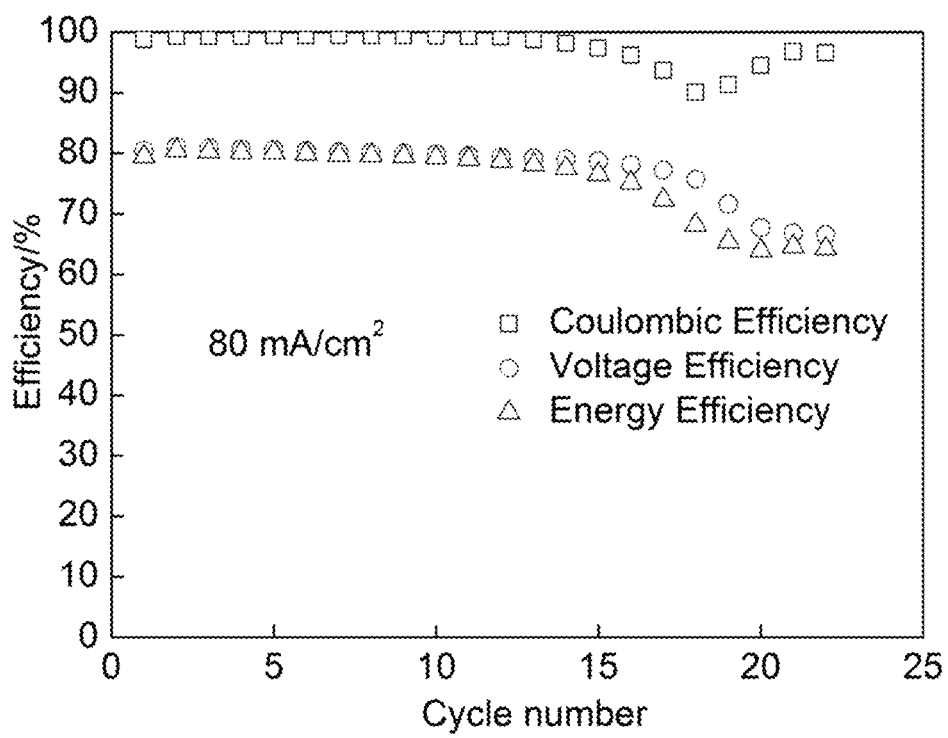
FIG. 26 shows the cycle performance of a single cell zinc iodine dual-flow battery according to comparative example 1; the positive and negative electrolyte are $ZnBr_2$: 2.5 M, KI: 5 M, KCl: 1 M Nafion 115 membrane with the thickness of 125 μm.
Figure 27:
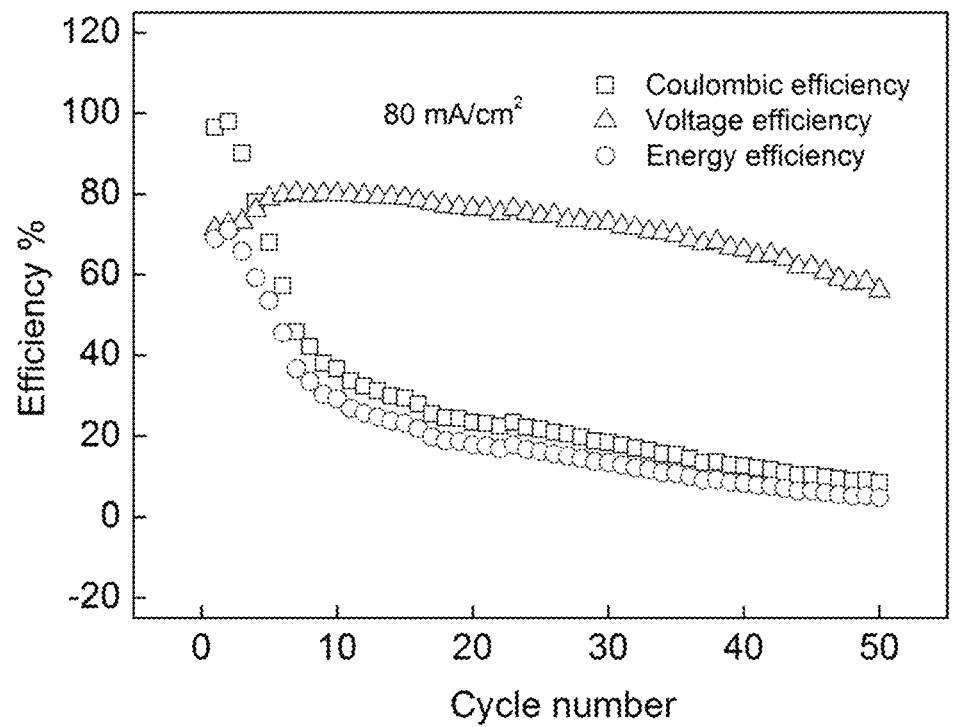
FIG. 27 shows the cycle performance of a single zinc iodine dual-flow battery according to comparative example 4; the positive and negative electrolyte is $ZnI_2$: 3 M, and the thickness of the porous membrane is 900 μm.
Figure 28:
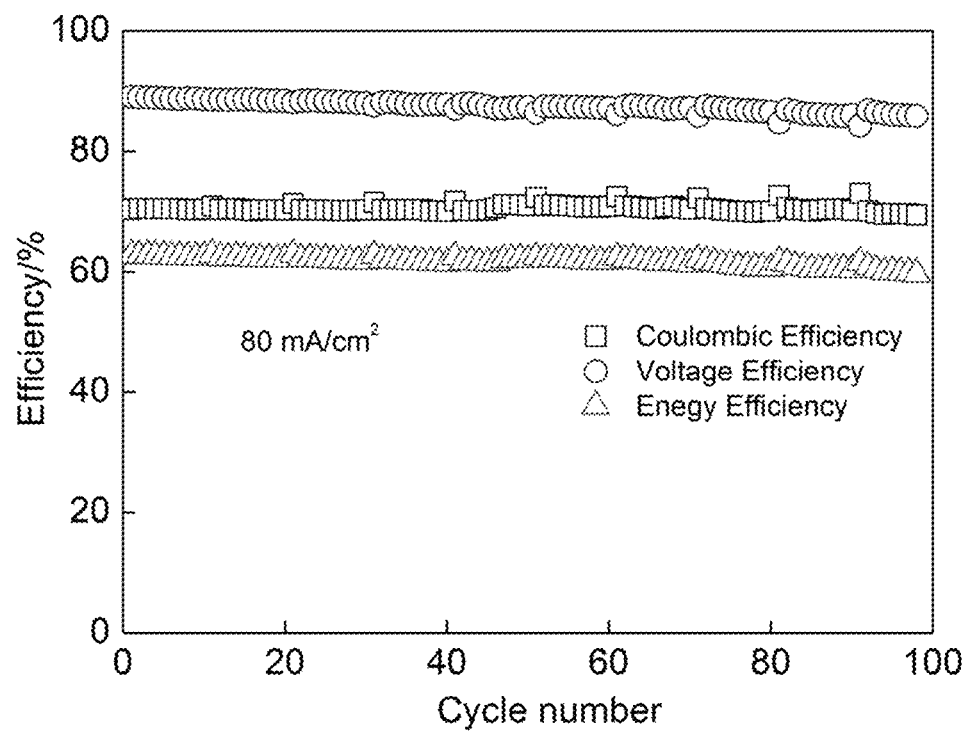
FIG. 28 shows the cycle performance of a single zinc iodine dual-flow battery according to comparative example 5; the positive and negative electrolyte is $ZnI_2$: 3 M, KI: 5 M, KCl: 1M, porous membrane with the thickness of 65 μm

Compared with the preferred example: Nafion 115 membrane was used for the battery in FIG. 26. Due to the poor conductivity of the membrane, the voltage efficiency of the battery was lower than that of optimal example, however, the employment of Nafion 115 membrane greatly reduced the crossover issue and greatly improved the coulombic efficiency of the battery. However, the performance of the battery deteriorated sharply after 15 cycles, which was due to the serious membrane fouling of the Nafion 115 membrane caused by $I_2$ and Zn dendrite, the membrane resistance increased greatly and the polarization was intensified. FIG. 27 used $ZnI_2$ as the electrolyte and the battery performance was severely degraded, which was caused by the instability of the positive and negative electrolytes. The positive electrolyte would form $I_2$ precipitation during the charging process and the negative electrolyte would form zinc oxide and hydroxide. FIG. 28 used a much thinner porous membrane, the cross-contamination of the electrolyte was intensified and the coulombic efficiency of the battery was greatly reduced.

We claim:
1. A zinc iodine flow battery, comprising:
an electrolyte storage tank containing an electrolyte, a circulation pump connected to the electrolyte storage tank, a positive end plate, a positive current collector, a positive electrode with a flow frame, a membrane, a negative electrode with a flow frame, a negative current collector and a negative end plate, a first cavity disposed between the membrane and the negative current collector, and a second cavity disposed between the membrane and the positive current collector, both the first cavity and the second cavity being connected to the circulation pump, wherein, during operation, the electrolyte is circulated between the first cavity and the electrolyte storage tank by the circulation pump, and the electrolyte is circulated between the second cavity and the electrolyte storage tank by the circulation pump, and
wherein the electrolyte contains KI and $ZnBr_2$.

2. The zinc-iodine flow battery according to claim 1, wherein a molar concentration of KI in the electrolyte is 2 to 8 mol/L, and a molar concentration of $ZnBr_2$ in the electrolyte is 1 to 4 mol/L, and a molar ratio of iodine and zinc in the electrolyte is between 2:1.

3. The zinc-iodine flow battery according to claim 1, wherein the electrolyte further comprises a supporting electrolyte selected from the group consisting of KCl, KBr, NaCl, and mixtures thereof.

4. The zinc-iodine flow battery according to claim 1, wherein the membrane is a porous membrane without ion-exchange groups selected from polyethersulfone (PES), polyethylene (PE), polypropylene (PP), polysulfone (PS), polyetherimide (PEI), and polyvinylidene fluoride (PVDF), having a thickness of 100 to 1000 μm, a pore size of 1-10 nm, and a porosity of 20%-70%.

5. The zinc-iodine flow battery according to claim 1, wherein the membrane is a composite membrane having a porous membrane without ion-exchange groups coated with a layer of polymeric material that is polybenzimidazole (PBI), a Nafion resin, and polytetrafluoroethylene (PTFE), and a thickness of the layer of polymeric material is 1-10 μm.

6. The zinc-iodine flow battery according to claim 1, wherein each of the positive electrode and the negative electrode has a substrate made from carbon felt, graphite plate, metal plate, or carbon cloth.

7. A zinc iodine flow battery, comprising:
a first electrolyte storage tank containing a first electrolyte, a second electrolyte storage tank containing a second electrolyte, a first circulation pump connected to the first electrolyte storage tank, a second circulation pump connected to the second electrolyte storage tank, a positive end plate, a positive current collector, a positive electrode with a flow frame, a membrane, a negative electrode with a flow frame, a negative current collector and a negative end plate, a first cavity disposed between the membrane and the negative current collector, and a second cavity disposed between the membrane and the positive current collector,
the first cavity being connected to the first circulation pump,
the second cavity being connected to the second circulation pump,
wherein, during operation, the first electrolyte is circulated between the first cavity and the first electrolyte storage tank by the first circulation pump, and the second electrolyte is circulated between the second cavity and the second electrolyte storage tank by the second circulation pump, and
wherein each of the first electrolyte and the second electrolyte contains KI and $ZnBr_2$.

8. The zinc-iodine flow battery according to claim 7, wherein, in each of the first electrolyte and the second electrolyte, a molar concentration of KI is 2 to 8 mol/L, and a molar concentration of $ZnBr_2$ is 1 to 4 mol/L, and a molar ratio of iodine and zinc is between 2:1.

9. The zinc-iodine flow battery according to claim 7, wherein each of the first electrolyte and the second electrolyte contains a supporting electrolyte selected from the group consisting of KCl, KBr, NaCl, and mixtures thereof.

10. The zinc-iodine flow battery according to claim 7, wherein the membrane is a porous membrane without ion-exchange groups selected from polyethersulfone (PES), polyethylene (PE), polypropylene (PP), polysulfone (PS), polyetherimide (PEI), and polyvinylidene fluoride (PVDF), having a thickness of 100 to 1000 a pore size of 1-10 nm, and a porosity of 20%-70%.

11. The zinc-iodine flow battery according to claim 7, wherein the membrane is a composite membrane having a porous membrane without ion-exchange groups coated with a layer of polymeric material that is polybenzimidazole (PM), a Nafion resin, and polytetrafluoroethylene (PTFE), and a thickness of the layer of polymeric material is 1-10 μm.

12. The zinc-iodine flow battery according to claim 1, wherein each of the positive electrode and the negative electrode has a substrate made from carbon felt, graphite plate, metal plate, or carbon cloth.

\* \* \* \* \*